(12) United States Patent  
Garben

(10) Patent No.: US 8,110,069 B2
(45) Date of Patent: Feb. 7, 2012

(54) METHODS AND APPARATUS FOR PEELING A FLEXIBLE SHEET FROM A SUBSTRATE

(75) Inventor: Ian Michael Garben, Burnaby (CA)

(73) Assignee: Kodak Graphic Communications Canada Company, Burnaby, British Columbia (CA)

( * ) Notice: Subject to any disclaimer, the term of this patent is extended or adjusted under 35 U.S.C. 154(b) by 353 days.

(21) Appl. No.: 12/441,723

(22) PCT Filed: Oct. 25, 2007

(86) PCT No.: PCT/IB2007/003206
§ 371 (c)(1),
(2), (4) Date: Mar. 18, 2009

(87) PCT Pub. No.: WO2008/053299
PCT Pub. Date: May 8, 2008

(65) Prior Publication Data
US 2009/0288760 A1    Nov. 26, 2009

Related U.S. Application Data

(60) Provisional application No. 60/864,385, filed on Nov. 3, 2006.

(51) Int. Cl.
*B32B 38/00* (2006.01)
(52) U.S. Cl. .................... 156/715; 156/759; 156/760
(58) Field of Classification Search .............. 156/714, 156/715, 759, 760, 764
See application file for complete search history.

(56) References Cited

U.S. PATENT DOCUMENTS

| 5,658,416 | A | 8/1997 | MacCollum et al. |
| 5,891,298 | A * | 4/1999 | Kuroda et al. ............... 156/716 |
| 6,843,297 | B2 | 1/2005 | MacKay et al. |
| 6,957,773 | B2 | 10/2005 | Gelbart |
| 7,757,741 | B2 * | 7/2010 | Ametani ....................... 156/764 |
| 2001/0017189 | A1 * | 8/2001 | Tsujimoto et al. ........... 156/344 |
| 2001/0025692 | A1 | 10/2001 | Lien |
| 2002/0092611 | A1 * | 7/2002 | Anderson et al. ............ 156/289 |
| 2006/0191633 | A1 * | 8/2006 | Hayasaka ..................... 156/344 |
| 2007/0235131 | A1 * | 10/2007 | Tsujimoto et al. ........... 156/344 |
| 2008/0185100 | A1 * | 8/2008 | Jang et al. .................... 156/344 |

FOREIGN PATENT DOCUMENTS
EP    050 308 A1   4/1982
EP    432 608 A2   6/1991

* cited by examiner

*Primary Examiner* — Mark A Osele
(74) *Attorney, Agent, or Firm* — Nelson Adrian Blish

(57) ABSTRACT

Methods and apparatus are described for removing donor sheets from substrates. A take-up roller contacts the donor element at or near an edge thereof and a peel roller contacts the donor element at a location spaced apart from the edge. A securing mechanism secures the edge of the donor element to the take-up roller which is then moved away from the substrate. While maintaining the peel roller in contact with the donor element, the take-up roller is rotated to take up the donor element while the peel roller and take-up roller are both simultaneously moved in a direction tangential to the substrate. In this manner, the donor element is peeled from the surface of the substrate.

55 Claims, 7 Drawing Sheets

METHODS AND APPARATUS FOR PEELING A FLEXIBLE SHEET FROM A SUBSTRATE

CROSS REFERENCE TO RELATED APPLICATIONS

This is a U.S. National Stage application under 35 U.S.C. 371 of International Application No. PCT/IB2007/003206, filed Oct. 25, 2007, which claims priority of U.S. Provisional Ser. No. 60/864,385, filed Nov. 3, 2006.

TECHNICAL FIELD

This invention relates to methods and apparatus for peeling or otherwise removing flexible sheets from substrates. Particular embodiments of this invention are provided in imaging machines, where flexible sheets incorporating donor material are imaged to impart donor material onto substrates and, after imaging, are removed from the substrates.

BACKGROUND

Color flat panel displays, such as liquid crystal displays and the like, typically incorporate color filters used to provide pixels with color. One technique for fabricating color filters involves a laser-induced thermal transfer process. A particular prior art thermal transfer process is illustrated schematically in FIG. 1A. A substrate (often referred to as a "receiver element") 10 is overlaid with a donor element (often referred to as a "donor sheet") 12. In the case of color filter fabrication, substrate 10 is typically made of glass and has a generally planar shape. Donor element 12 is typically a sheet which is relatively thin and relatively flexible when compared to substrate 10. Donor element 12 may be made of plastic, for example. Donor element 12 incorporates donor material (not shown). The donor material may comprise a colorant, a pigment or the like used to fabricate the color filter.

Donor element 12 is image-wise exposed to selectively transfer donor material from donor element 12 to substrate 10. Some exposure methods involve using one or more controllable lasers 14 to provide one or more corresponding laser beams 16. In currently preferred techniques, laser beam(s) 16 induce the transfer of donor material from the imaged regions of donor element 12 to corresponding regions of substrate 10. Controllable laser(s) 14 may comprise diode laser(s) which are relatively easy to modulate, have relatively low cost and have relatively small size. Such laser(s) 14 are controllable to directly image-wise expose donor element 12. In some embodiments, masks (not shown) are used to image-wise expose donor element 12.

Once the donor material has been image-wise transferred from donor element 12 to substrate 10, it is typically necessary to remove the used ("spent") donor element 12 from substrate 10. For example, during the fabrication of color filters, a first donor element 12 may be used to apply red colorant to substrate 10, a second donor element 12 may be used to apply green colorant and a third donor element 12 may be used to apply blue colorant. After use, each spent donor element 12 is removed from substrate 10 prior to application and use of a subsequent donor element 12.

In many cases, at the conclusion of the imaging process, the "transferred" donor material may adhere partially to substrate 10 but may also remain partially adhered to donor element 12. This partial adherence of the donor material to both substrate 10 and donor element 12 can make it difficult to remove donor element 12 from substrate 10.

In prior art techniques, donor element 12 is removed from substrate 10 using a roller 18 incorporating one or more suction features 20. Roller 18 is brought into proximity of edge 12A of donor element 12 (as shown by arrow 19) and then suction is applied through suction features 20, such that edge 12A of donor element 12 is secured to suction features 20. Roller 18 is then rotated (as shown by arrow 22) and translated (as shown by arrow 24) to wind donor element 12 off of substrate 10 and onto the circumferential surface 18A of roller 18 and to thereby peel donor element 12 from substrate 10.

This technique for removing donor element 12 from substrate 10 suffers from a number of drawbacks which tend to reduce the quality of the image on substrate 10 (i.e. the donor material imparted onto substrate 10). One of these drawbacks is shown in FIG. 1B. As donor element 12 is wound onto the cylindrical surface 18A of roller 18, there reaches a time where the portion of donor element 12 currently being peeled from substrate 10 approaches leading edge 12A of donor element 12 on cylindrical surface 18A. Donor element 12 has a non-negligible thickness, which causes the take-up of donor element 12 to exhibit a discontinuity 26 or the like in the portion of donor element 12 which overlaps leading edge 12A. This discontinuity 26 can effect the donor material transferred to substrate 10 or otherwise result in artefacts in the image imparted onto substrate 10. This phenomenon may be referred to as "print-through". In some circumstances, such print-through artefacts can repeat at regular intervals related to the circumference of roller 18.

Another drawback associated with prior art techniques for removing donor element 12 from substrate 10 relates to variations in the peel angle θ (i.e. the angle at which donor element 12 is pulled from substrate 10—See FIG. 1B). Such variations in peel angle θ may be caused by the thickness of donor element 12, stretching of donor element 12, variations in the peeling tension or other factors. Variations in peel angle θ may also cause artefacts in the image imparted onto substrate 10.

There is a general desire to provide methods and apparatus for more effectively removing spent donor elements from a substrate after donor material has been transferred from a donor element to the substrate.

SUMMARY

One aspect of the invention provides a method for removing a donor element from a substrate. The method involves effecting relative movement between a peel roller and the substrate so as to move the peel roller into a vicinity of a first portion of the donor element. The first portion of the donor element is spaced-apart from an edge of the donor element and the vicinity of the first portion is sufficiently close to the donor element to maintain the first portion of the donor element in contact with the substrate. The method also involves effecting relative movement between a take-up roller and the substrate so as to move the take-up roller into a vicinity of the edge of the donor element and, when the take-up roller is in the vicinity of the edge, securing a second portion of the donor element including the edge to the take-up roller. While maintaining the peel roller in the vicinity of the first portion, the method also involves: effecting relative movement between the take-up roller and the substrate so as to move the take-up roller and the second portion of the donor element secured thereto in a direction away from the substrate; and rotating the take-up roller about its axis while effecting relative movement between the substrate and the peel roller in a direction tangential to the substrate to peel at least a substantial portion of the donor element from the substrate.

Another aspect of the invention provides an apparatus for removing a donor element from a substrate. The apparatus comprises: a peel roller; a take-up roller comprising a securing mechanism for securing a first portion of the donor element, which includes an edge of the donor element, to the take-up roller; a chassis for supporting the peel roller and the take-up roller, such that the peel roller is rotatable relative to the chassis and the take-up roller is both moveable and rotatable relative to the chassis; and a controller. The controller is configured to effect relative movement between the chassis and the substrate so as to move the chassis to a position where the peel roller is in a vicinity of a second portion of the donor element. The second portion is spaced-apart from the edge of the donor element and the vicinity of the second portion is sufficiently close to the donor element to maintain the second portion of the donor element in contact with the substrate. The controller is also configured to effect relative movement between the take up roller and the substrate so as to move the take-up roller into a vicinity of the first portion of the donor element and, when the take-up roller is in the vicinity of the first portion, activate the securing mechanism to secure the first portion to the take-up roller. While maintaining the peel roller in the vicinity of the second portion of the donor element, the controller is also configured to: effect relative movement between the take-up roller and the substrate so as to move the take-up roller and the first portion of the donor element secured thereto in a direction away from the substrate; and rotate the take-up roller about its axis while effecting relative movement between the substrate and the peel roller in a direction tangential to the substrate to peel at least a substantial portion of the donor element from the substrate.

Another aspect of the invention provides a method for removing a donor element from a substrate. The method involves moving a peel roller into contact with a first portion of the donor element. The first portion of the donor elements is spaced-apart from an edge of the donor element. The method also involves securing a second portion of the donor element in a securing mechanism. The second portion of the donor element comprises the edge of the donor element. The method also involves: exerting a desired tension on the second portion of the donor element at a desired peel angle relative to a plane tangential to the substrate; and moving the securing mechanism and the peel roller to peel at least a portion of the donor element from the substrate while maintaining the peel roller in contact with the second portion of the donor element, tracking the desired tension and tracking the desired peel angle.

Another aspect of the invention provides an apparatus for removing a donor element from a substrate. The apparatus comprises: a peel roller; a securing mechanism for securing a first portion of the donor element (the first portion including an edge of the donor element); a moveable chassis for supporting the peel roller and the securing mechanism, such that the peel roller is rotatable relative to the chassis and the take-up roller is moveable relative to the chassis; and a controller. The controller is configured to move the chassis to a position where the peel roller contacts a second portion of the donor element. The second portion of the donor element is spaced-apart from the edge of the donor element. The controller is also configured to: move the securing mechanism into a position wherein the securing mechanism can secure the first portion of the donor element and then move the securing mechanism and the first portion of the donor element secured thereto to establish a desired tension on the first portion of the donor element at a desired peel angle relative to a plane tangential to the substrate; and move the securing mechanism and the peel roller to peel the donor element from the substrate while maintaining the peel roller in contact with the first portion of the donor element, tracking the desired tension and tracking the desired peel angle.

Further aspects of the invention, further features of specific embodiments of the invention and applications of the invention are described below.

BRIEF DESCRIPTION OF DRAWINGS

In drawings which show non-limiting embodiments of the invention.

LIST OF REFERENCE NUMERALS

Figure 1A:
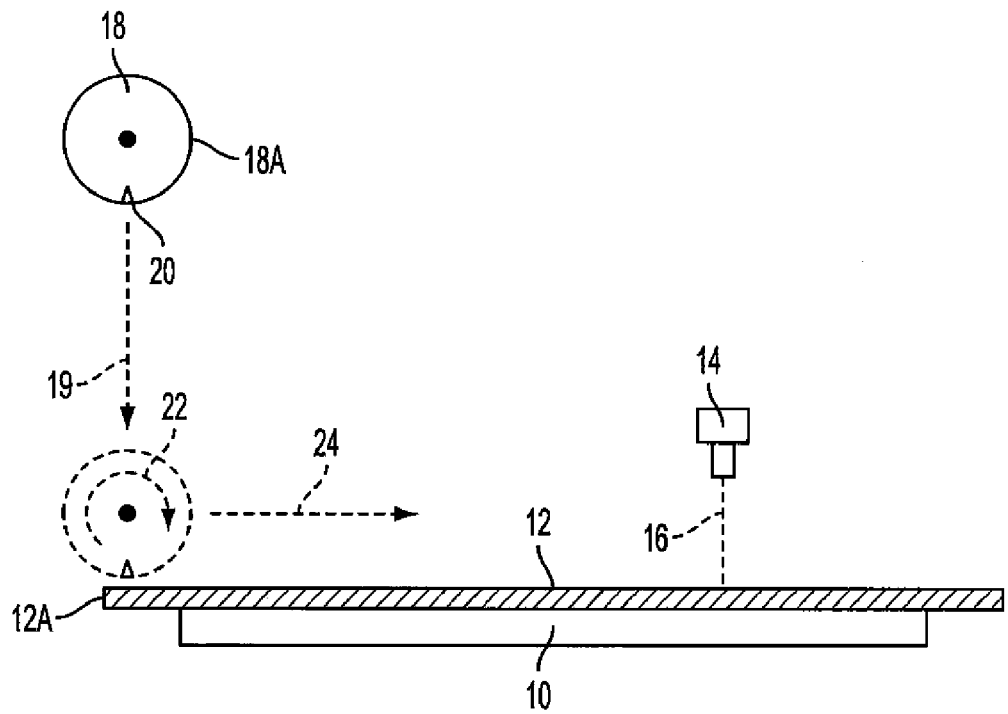
FIG. 1A schematically illustrates a prior art thermal transfer imaging process used to transfer donor material from a donor element to a substrate during the fabrication of a color filter and a technique for removing the spent donor element from the substrate.
Figure 1B:
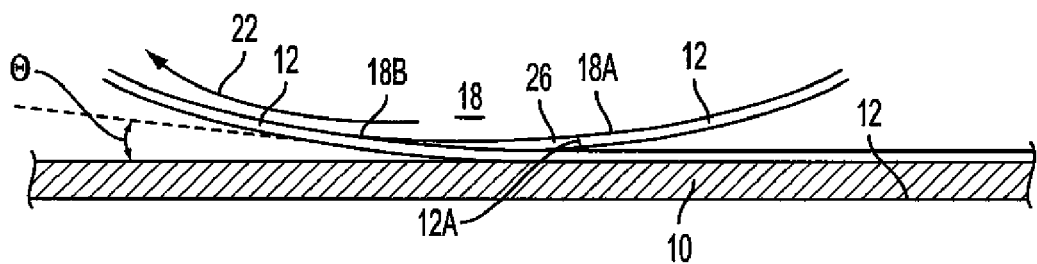
FIG. 1B schematically illustrates one of the drawbacks of the FIG. 1A donor element removal technique which results from the non-negligible thickness of the donor element.

θ peel angle
10 substrate
12 donor element
12A leading edge of donor element
14 laser(s)
16 laser beam(s)
18 roller
18A circumferential surface of roller
19 arrow showing movement of roller
20 suction features
22 arrow indicating rotation of roller
24 arrow indicating translation of roller
26 discontinuity caused by thickness of donor element
102 imaging apparatus
104 imaging table
105 substrate
106
108
110 substrate
112 donor element
112A leading edge of donor element
112B non-imaged region of donor element
112C imaged region of donor element
112D
113 overhanging portion of non-imaged region of donor element
114 laser(s)
116 laser beam(s)
118 stands
120 suction features
122 space between stands and edges of substrate
124
126
128
129 sheet removal apparatus 130 peel roller
130A axis of peel roller
132 take-up roller
132A axis of take-up roller
133 take-up roller axis position actuator
134 suction features
135 control signal for take-up roller axis position actuator
136 chassis
137 control signal for chassis-position actuators
138 peel roller coupling
139 take-up roller rotational actuator
140 take-up roller coupling
141 control signal for take-up roller rotational actuator
142 arrow for take-up roller movement away from table
143 suction source
144
145 control signal for suction source
146 arrow for rotation of take-up roller
147
148 arrow for movement of chassis along table
149
150 arrow for chassis movement toward the table
202 imaging apparatus (not shown in current views)
204 imaging table
206
208
210 substrate
212 donor element
212A leading edge of donor element
212B overhanging portion of donor element (not shown explicitly in current views)
212C border region of donor element (not shown explicitly in current views)
212D imaged region of donor element (not shown in explicitly current views)
214 laser(s) (not shown in current views)
216 laser beam(s) (not shown in current views)
218
220
222
224
226
228 pivot assembly of take-up roller axis position actuator
229 sheet removal apparatus
230 peel roller
230A axis of peel roller
232 take-up roller
232A axis of take-up roller
233 take-up roller axis position actuator
234 suction features
235 control signal for take-up roller axis position actuator (not shown in current views)
236 chassis
237 control signal for chassis-position actuators (not shown in current views)
238 peel roller coupling
239 take-up roller rotational actuator
240 take-up roller coupling
241 control signal for take-up roller rotational actuator (not shown in current views)
242 arrow for take-up roller movement away from table (not shown in current views)
243 suction source (not shown in current views)
244
245 control signal for suction source (not shown in current views)
246 arrow for rotation of take-up roller (not shown in current views)
247
248 arrow for movement of chassis along table (not shown in current views)
249
250 arrow for chassis movement toward the table (not shown in current views)

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the disclosure. Accordingly, the specification and drawings are to be regarded in an illustrative, rather than a restrictive, sense.

Figure 2A:
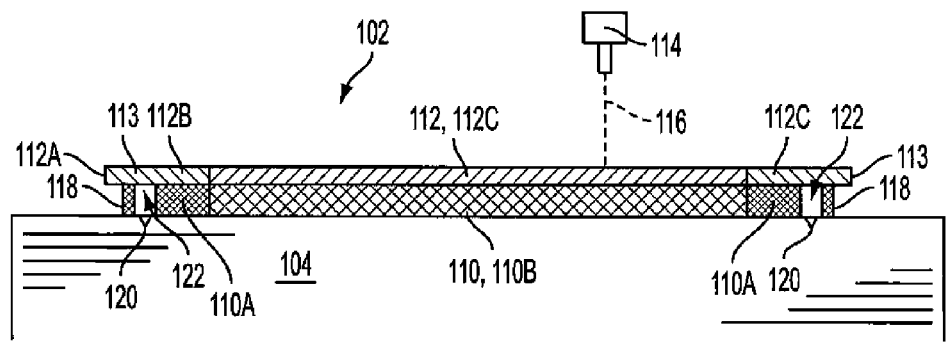
FIGS. 2A-2D depict a method and apparatus according to a particular embodiment of the invention for removal of a donor element from a substrate after use of the donor element in a thermal transfer imaging process.

FIGS. 2A-2D depict a method and apparatus according to a particular embodiment of the invention for removal of a donor element 112 from a substrate 110 after use of the donor element in a thermal transfer imaging process. In the illustrated embodiment, as shown in FIG. 2A, the thermal transfer imaging process takes place on a planar imaging apparatus 102 which may be referred to as a "flatbed" imaging apparatus. In flatbed imaging apparatus 102, substrate 110 is secured to table 104. As is known in the art, there are a variety of techniques for securing substrate 110 to table 104. Donor element 112 is then laid atop substrate 110. To preserve image quality, it is desirable that donor element 112 be prevented from moving with respect to substrate 110 during imaging. In the illustrated embodiment, table 104 comprises stands 118 which are transversely spaced apart from the edges of substrate 110 and which have heights that are substantially similar to the thickness of substrate 110. Table 104 also comprises one or more suction features 120 which apply suction in the space 122 between stands 118 and substrate 110. This suction secures donor element 112 to substrate 110. It will be appreciated by those skilled in the art that there are other additional and/or alternative techniques for securing donor element 112 to substrate 110 and the invention should be understood to accommodate such additional and/or alternative donor element securing techniques.

The transfer of donor material from donor element 112 to substrate 110 may be implemented using a variety of techniques, such as laser-induced thermal transfer, for example. Examples of laser-induced thermal transfer processes in conjunction with which the invention may be used include: laser-induced "dye transfer" processes, laser-induced "melt transfer" processes, laser-induced "ablation transfer" processes, and laser-induced "mass transfer" processes.

In the illustrated embodiment, donor material (not shown) is image-wise transferred from donor element 112 to substrate 110 by a thermal transfer process using one or more controllable laser(s) 114 which generate one or more corresponding laser beam(s) 116. Laser(s) 114 may be controlled by controller 108.

In general, the make-up of substrate 110, donor element 112, and the donor material depend on the particular imaging application. In particular embodiments, imaging apparatus 102 is used to fabricate color filters for flat panel displays on substrate 110. In such embodiments, substrate 110 is typically made of a transparent material (e.g. glass), donor element 112 is typically made of plastic and the donor material (also known as the "image-forming material") typically comprises one or more colorants. Such colorants may include suitable dye-based or pigment-based compositions, for example. The donor material may also comprise one or more suitable binder materials.

To image substrate 110, relative movement is created between laser(s) 114 and table 104. Such relative movement may be effected by a variety of techniques and apparatus (not shown) which are known in the art. Such relative movement may involve moving table 104 and/or laser(s) 114 and such relative movement may be controlled by controller 108. In the illustrated embodiment, the relative movement between laser(s) 114 and table 104 and/or the operation of laser(s) 14 is constrained such that laser(s) 114 impinge on region 112C of donor element 112. Consequently, region 112B of donor element 112 remains as a non-imaged area and may, in some cases, provide a border around imaged region 112C. Accordingly, in the illustrated embodiment, donor material is only transferred from donor element 112 onto imaged region 110B of substrate 110 and not into non-imaged region 110A of substrate 110. In the illustrated embodiment, portions 113 of non-imaged region 112B overhang substrate 110 and are supported by stands 118.

Figure 2B:
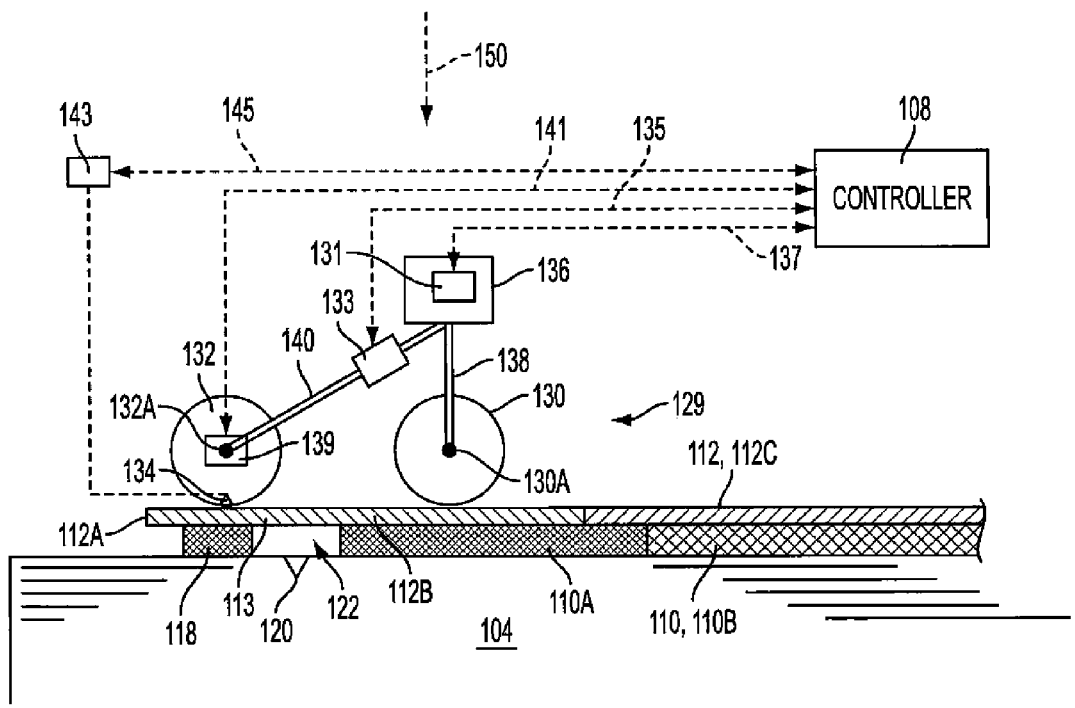
Figure 2C:
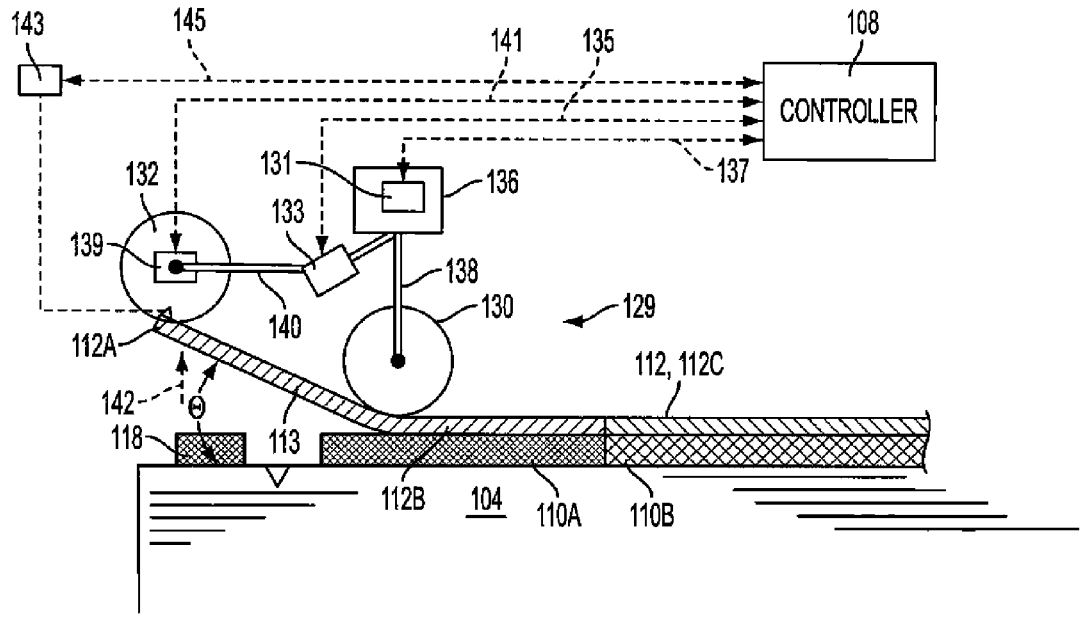
Figure 2D:
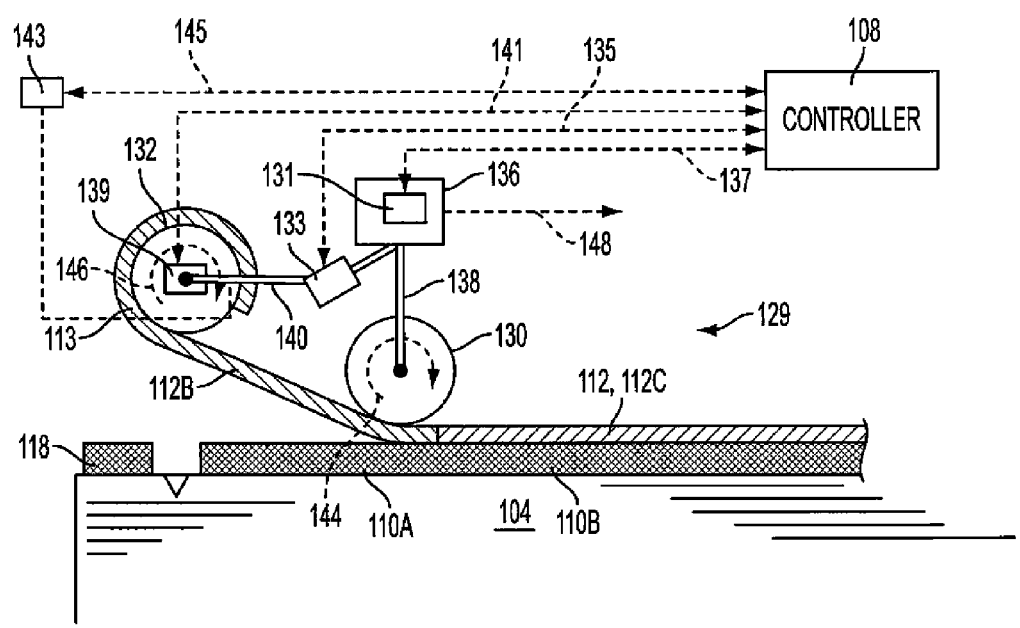

At the conclusion of the imaging process, donor element 112 is removed from substrate 110. FIGS. 2B-2D depict a method and apparatus for removing donor element 112 from substrate 110 according to a particular embodiment of the invention. FIG. 2B is a schematic partial side view depicting one end of table 104, substrate 110 and donor element 112. The removal of donor element 112 from substrate 110 is effected by sheet removal apparatus 129. In the illustrated embodiment, sheet removal apparatus 129 comprises a chassis 136 and a pair of rollers (peel roller 130 and take-up roller 132) which are mechanically coupled to chassis 136 by a corresponding pair of roller couplings (peel roller coupling 138 and take-up roller coupling 140).

Rollers 130, 132 are preferably substantially cylindrical in shape. Peel roller coupling 138 and take-up roller coupling 140 permit their respective rollers 130, 132 to rotate about their corresponding axes 130A, 132A. In the illustrated embodiment, take-up roller coupling 140 comprises an actuator 133 which effects movement of the axis 132A of take-up roller 132 with respect to chassis 136. Actuator 133 is referred to herein as the "take-up roller axis-position actuator 133". Take-up roller axis-position actuator 133 may be controlled by controller 108 using signal 135. Take-up roller axis-position actuator 133 may generally comprise any suitably coupled actuator. Non-limiting examples of actuators which may be used to provide take-up roller axis-position actuator 133 include suitably coupled electric motors and/or pneumatic actuators.

In the illustrated embodiment, take-up roller coupling 140 also comprises a take-up roller rotational actuator 139 which causes rotation of take-up roller 132 about its axis 132A. Take-up roller rotational actuator 139 may be controlled by controller 108 using signal 141. Preferably, take-up roller rotational actuator 139 comprises a suitably coupled motor, but take-up roller rotational actuator 139 may generally comprise any suitably configured actuator.

In the illustrated embodiment, take-up roller 132 also comprises one or more suction features 134. Suction features 134 may comprise orifices coupled in fluid communication to a source of suction 143. As is known in the art, suction source 143 may comprise a mechanism for creating a positive or negative pressure differential, such as a suitably configured pump or the like. Suction source 143 may be controlled by controller 108 using signal 145 which may also control one or more valves or similar components (not shown) related to the application of suction by suction sources 143.

In the illustrated embodiment, peel roller 130 is a non-driven "idler" roller. In alternative embodiments, peel roller 130 may be rotationally driven.

Sheet removal apparatus 129 also comprises one or more chassis-position actuators 131 which cause relative movement between table 104 and chassis 136. Relative movement between table 104 and chassis 136 results in corresponding movement between table 104 and rollers 130, 132. In the illustrated embodiment, chassis-position actuators 131 cause movement of chassis 136 relative to table 104 to effect relative movement between table 104 and chassis 136. In other embodiments, chassis-position actuators 131 cause movement of table 104 relative to chassis 136 to effect relative movement between table 104 and chassis 136. In some embodiments, chassis 136 also supports imaging laser(s) 114 (FIG. 2A) in which case chassis-position actuators 131 may comprise one or more of the same actuators which facilitate relative movement between imaging laser(s) 114 and table 104. Chassis-position actuators 131 may generally comprise any one or more suitably coupled actuators. Non-limiting examples of actuators which may be used to provide chassis-position actuators 131 include, suitably coupled electric motors and/or pneumatic actuators.

When it is desired to remove donor element 112 from substrate 110, controller 108 uses signal 137 to cause chassis-position actuators 131 to create relative movement between chassis 136 and table 104, such that chassis 136 and the rest of sheet removal apparatus 129 are positioned in the vicinity of one edge 112A of donor element 112 (see FIG. 2B). In the illustrated embodiment, sheet removal apparatus 129 approaches donor element 112 from a vertical direction as shown by arrow 150. In other embodiments, chassis-position actuators 131 cause sheet removal apparatus 129 to approach donor element 112 (or donor element 112 to approach sheet removal apparatus 129) from other directions. Sheet removal apparatus 129 moves toward donor element 112 until peel roller 130 makes contact with donor element 112. Preferably, peel roller 130 contacts donor element 112 in non-imaged region 112B (i.e. outside of imaged region 112C). This positioning of the contact between peel roller 130 and donor sheet 112, while not essential to the invention, avoids an impact of peel roller 130 in imaged region 112C of donor element 112 and prevents any corresponding degradation of the image in imaged region 110B of substrate 110.

In the illustrated embodiment, in addition to moving chassis 136, controller 108 also uses signal 135 to cause take-up roller axis-position actuator 133 to move take-up roller 132 into the vicinity of donor element 112. Preferably, take-up roller 132 moves into the vicinity of non-imaged region 112B of donor element 112 at a location that is further from imaged region 112C than the location of peel roller 130. In some embodiments, as shown in FIG. 2B, take-up roller 132 moves into the vicinity of portion 113 of non-imaged region 112B. In currently preferred embodiments, take-up roller 132 moves into the vicinity of portion 113 at a location which at least partially overlies stand 118. In some embodiments, take-up roller 132 moves into the vicinity of non-imaged region 112B at a location that is spaced further from the edge of substrate 110 than suction features 120 which secure donor sheet 112 to substrate 110.

When take-up roller 132 makes contact with donor element 112, controller 108 uses signal 145 to cause suction source 143 to apply suction through suction features 134. The application of suction through suction features 134 causes a portion of non-imaged region 112B (including leading edge 112A) to adhere to take-up roller 132 (i.e. suction features 134 secure a portion of non-imaged region 112B to take-up roller 132). In some embodiments, take-up roller 132 contacts donor element 112 in non-imaged region 112B and suction is applied directly to secure donor element 112 to take-up roller 132. In other embodiments, take-up roller 132 need not contact donor element 112 before suction is applied. In such embodiments, when suction is applied through suction features 134, a portion of donor element 112 may be drawn toward take-up roller 132 before being secured thereto. In some embodiments, controller 108 may turn off or reduce the suction applied by suction features 120 prior to or during the application of suction through suction features 134.

In some embodiments, suction features 134 are located in one or more known locations on the cylindrical surface of take-up roller 132. In such embodiments, controller 108 preferably uses signal 141 to operate take-up roller rotational actuator 139 in a "position mode". In position mode operation, controller 108 uses a control technique which causes actuator 139 to move take-up roller 132 at any velocity (within its controllable velocity range) to achieve a desired position. As illustrated in FIG. 2B, the desired position of take-up roller 132 is a position where suction features 134 are located proximate to donor element 112. In the illustrated embodiment, take-up roller 132 is shown as having suction features in only one circumferential location on its cylindrical surface. Those skilled in the art will appreciate that in other embodiments, take-up roller 132 may comprise suction features at a plurality of circumferential locations on its cylindrical surface.

FIG. 2C shows that once leading edge 112A of donor element 112 is secured to the cylindrical surface of take-up roller 132, controller 108 uses signal 135 to cause take-up roller axis-position actuator 133 to move take-up roller 132 away from substrate 110 (i.e. in a direction that has at least a component in the direction of arrow 142). As can be seen by comparing FIGS. 2B and 2C, take-up roller axis-position actuator 133 causes movement of take-up roller 132 with respect to chassis 136 and with respect to peel roller 130 while chassis 136 and peel roller 130 remain in the same positions. Leading edge 112A of donor element 112 and possibly some of non-imaged region 112B move away from table 104 when take-up roller 132 moves in this manner.

As shown in FIG. 2C, peel roller 130 preferably remains in contact with, and may exert force against, donor element 112. Consequently, a portion of donor element 112 on one side of peel roller 130 (i.e. the side away from take-up roller 132) remains in contact with substrate 110 while a portion of donor element 112 on the opposite side of peel roller 130 (i.e. the same side as take-up roller 132) peels away from substrate 110 and bends around the circumferential surface of peel roller 130. Characteristics of peel roller 130 (e.g. its diameter and/or the material which forms its cylindrical surface) and/or characteristics of the manner in which peel roller 130 contacts donor element 112 (e.g. the force and/or pressure of such contact) can be used to control the effective area of contact between donor element 112 and substrate 110 immediately prior to peeling. In some embodiments, the effective area of contact between peel roller 130 and donor element 112 is less than 10% of the circumferential surface area of peel roller 130. In other embodiments, this ratio is less than 5%. In some embodiments, the force applied between peel roller 130 and donor element 112 is less than the force of gravity acting on peel roller 130 (i.e. chassis 136 supports some of the weight of peel roller 130).

The movement of take-up roller 132 away from substrate 110 may also comprise movement of take-up roller in one or more directions that are tangential to substrate 110. For example, take-up roller axis position actuator 133 may cause take-up roller 132 to move on a curved path. During the movement of take-up roller 132 away from substrate 110, controller 108 may also use signal 141 to cause take-up roller rotational actuator 139 to pivot take-up roller 132 about its axis 132A. Such pivotal motion of take-up roller 132 can be used to take-up any slack in the portion of donor element 112 which has been peeled from substrate 110 or to otherwise track a desired tension on this portion of donor element 112. During this period, controller 108 may use signal 104 to control take-up roller rotational actuator 139 in "torque mode". In torque mode operation, controller 108 uses a control technique which causes actuator 139 to move take-up roller 132 at any velocity (within its controllable velocity range) to track a desired torque.

Those skilled in the art will appreciate that the amount of movement of take-up roller 132 by take-up roller axis-position actuator 133 may be varied to achieve a desired peel angle $\theta$. In the illustrated embodiment, where peel roller 130 and take-up roller 132 are substantially the same size, peel angle $\theta$ will be the same as the angle between the rotational axes 130A, 132A of rollers 130, 132. In some embodiments, peel angle $\theta$ is in a range of 0°-30° depending in part on the media (i.e. the donor material, substrate 110 and donor element 112). In currently preferred embodiments, peel angle $\theta$ is in a range of 0°-5°.

Next, as shown in FIG. 2D, controller 108 uses signal 137 to cause chassis-position actuators 131 to move chassis 136 (including rollers 130, 132) in the direction of arrow 148 and uses signal 141 to cause take-up roller rotation actuator 139 to simultaneously rotate take-up roller 132 with respect to chassis 136 and table 104 in the direction of arrow 146. This simultaneous movement of chassis 136 and rotation of take-up roller 132 pulls donor element around peel roller 130 and peels donor element 112 from substrate 110. In currently preferred embodiments, the rate of translation of chassis 136 is in a range of 0-500 mm/s.

Preferably, during this part of the sheet peeling process, controller 108 uses signal 141 to operate take-up roller rotational actuator 139 in a "torque mode", where controller 108 causes take-up roller 132 to rotate at any velocity (within its controllable velocity range) to achieve a desired torque. When take-up roller rotational actuator 139 operates in torque mode to track this desired torque, the peeling tension on donor element 112 is maintained relatively close to the desired peeling tension. In other embodiments, controller 108 uses signal 141 to operate take-up roller rotational actuator 139 in a "position mode" to track a position that is synchronized with the translational position of chassis 136.

As take-up roller 132 rotates in the direction of arrow 146 and translates in the direction of arrow 148, donor element 112 is "taken up" by (i.e. winds around the cylindrical surface of) take-up roller 132. Peel roller 130 remains in contact with the portion of donor element 112 which is still on substrate 110 and may apply a force against donor element 112. As discussed above, in the illustrated embodiment, peel roller 130 is an idler roller. Peel roller 130 prevents donor element 112 from separating prematurely from substrate 110 and ensures that donor element 112 is separated from substrate 110 at the desired peel angle $\theta$.

The simultaneous rotation and translation of both peel roller 130 and take-up roller 132 during the sheet peeling process also prevents the "print-through" effect. Since take-up roller 132 is spaced-apart from substrate 110, the image imparted onto substrate 110 is unaffected when the portion of donor sheet 112 being wound onto take-up roller 132 overlaps leading edge 112A. The change in thickness caused by the leading edge 112A of donor element 112 does not impact the image imparted onto substrate 110.

As peel roller 130 approaches the trailing edge of donor element 112, controller 108 may use signal 137 to cause chassis-position actuator 131 to move chassis 136 away from donor element 112 and may use signal 141 to cause take-up roller rotational actuator 139 to rotate take-up roller 132 so as to take-up the "tail" of donor element 112. Controller 108 may operate take-up roller rotational actuator 139 in a position mode during this portion of the sheet removal process.

FIGS. 3A-3F depict various partial views of an apparatus 229 according to another embodiment of the invention for removal of a donor element 212 from a substrate 210 after use of donor element 212 in a thermal transfer imaging process. In many respects, sheet removal apparatus 229 of FIGS. 3A-3F is similar to sheet removal apparatus 129 of FIGS. 2B-2D. In this regard, similar reference numbers have been used to indicate features of sheet removal apparatus 229 that correspond to similar features of sheet removal apparatus 129, except that the reference numbers of sheet removal apparatus 229 are preceded by the numeral "2" and the reference numbers of sheet removal apparatus 129 are preceded by the numeral "1".

Sheet removal apparatus 229 is suitable for use in a flatbed imaging apparatus. For clarity, the elements of the imaging apparatus not germane to the removal of donor element 212 from substrate 210 are not shown in the illustrated views of FIGS. 3A-3F. In order to show various components with greater clarity, some of the illustrated views of sheet removal apparatus 229 (FIGS. 3A-3F) also omit various components of sheet removal apparatus 229.

Figure 3A:
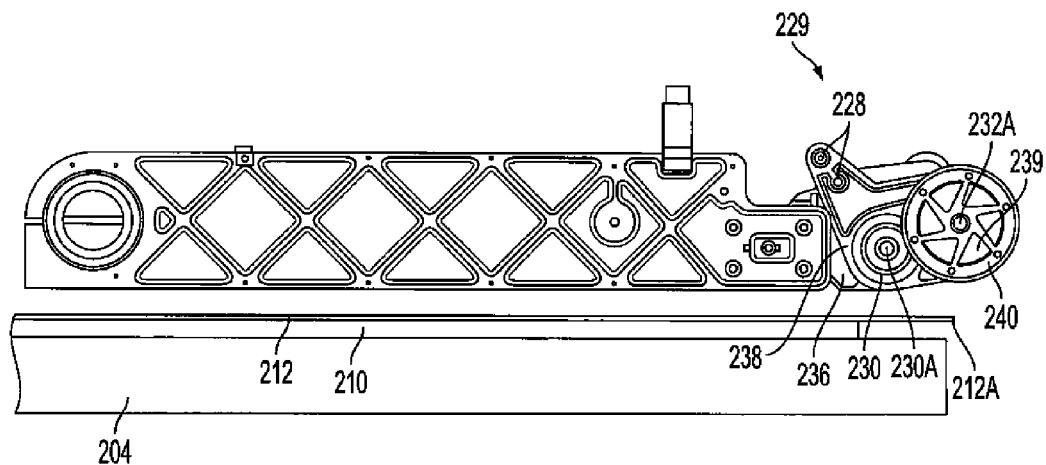
FIGS. 3A-3F depict various partial views of an apparatus according to another embodiment of the invention for removal of a donor element from a substrate after use of the donor element in a thermal transfer imaging process.

The imaging apparatus in which sheet removal apparatus 229 is deployed may comprise components similar to those of imaging apparatus 102 of FIG. 2A and may operate in a manner similar to imaging apparatus 102 of FIG. 2A. As shown in FIG. 3A, the imaging apparatus in which sheet removal apparatus 229 operates supports and secures substrate 210 on an imaging table 204. Donor element 212 may be laid atop substrate 210 and used in a thermal transfer imaging technique to image-wise transfer donor material from donor element 212 to substrate 210. The imaging apparatus may be similar to the imaging apparatus described in U.S. Pat. No. 6,957,773, for example.

Figure 3B:
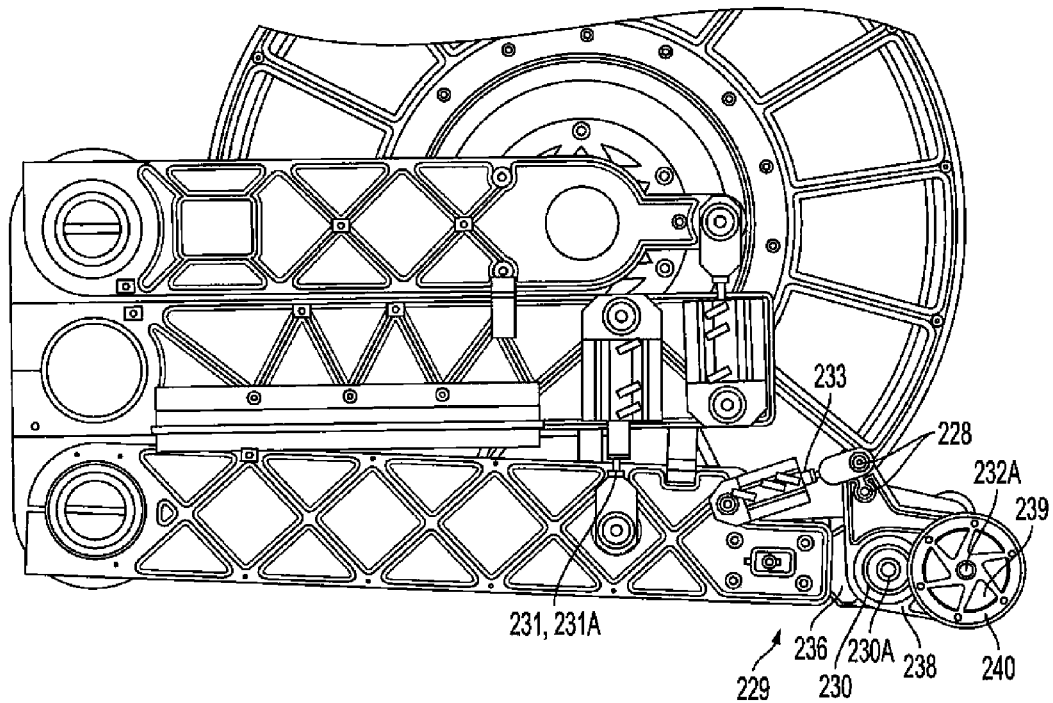
Figure 3C:
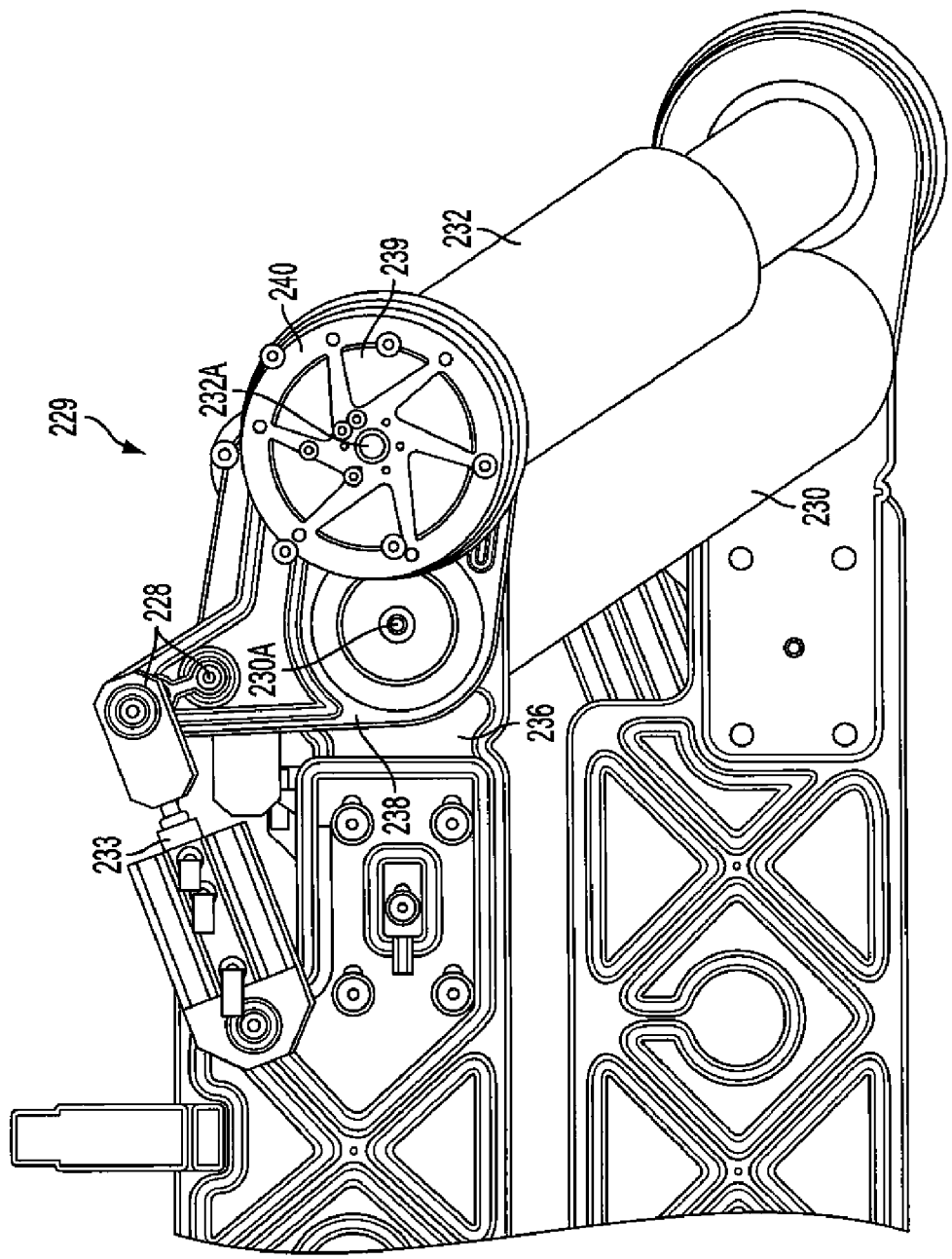

Sheet removal apparatus 229 comprises a chassis 236. Chassis 236 incorporates peel roller coupling 238 and take-up roller coupling 240 which respectively support peel roller 230 and take-up roller 132 while allowing peel roller 230 and take-up roller 232 to rotate about their corresponding axes 230A, 232A. As shown in FIGS. 3B and 3C, take-up roller coupling 240 comprises an axis-position actuator 233 which causes movement of take-up roller 232 relative to chassis 236 and a rotational actuator 239 which causes rotational movement of take-up roller 232 relative to chassis 236. In the illustrated embodiment, take-up roller rotational actuator 239 comprises a suitably coupled electric motor.

In the illustrated embodiment, take-up roller axis-position actuator 233 comprises a pneumatic actuator which causes pivotal motion of pivot linkage 228, which in turn causes movement of take-up roller 232. In the illustrated embodiment, take-up roller axis position actuator 233 and pivot linkage 228 cooperate to move take-up roller 232 along a curved path having a constant radius of curvature centered at axis 230A of peel roller 230. Thus, the movement of take-up roller axis-position actuator 233 moves take-up roller 232 with respect to chassis 236 while maintaining a constant spacing between take-up roller 232 and peel roller 230. In other embodiments, take-up roller axis-position actuator 233 may move take-up roller 232 along other paths.

A controller (not shown in the illustrated views) may control take-up roller axis-position actuator 233 and take-up roller rotational actuator 239 using suitable control signals (not shown). Those skilled in the art will appreciate that other suitable actuators coupled using other suitable linkages may be used to effect movement and rotation of take-up roller 232 with respect to chassis 236.

Figure 3D:
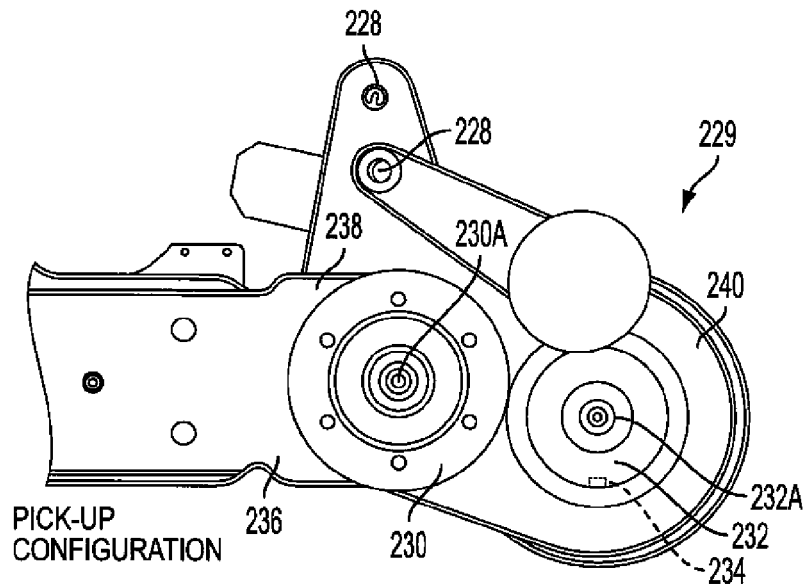
Figure 3E:
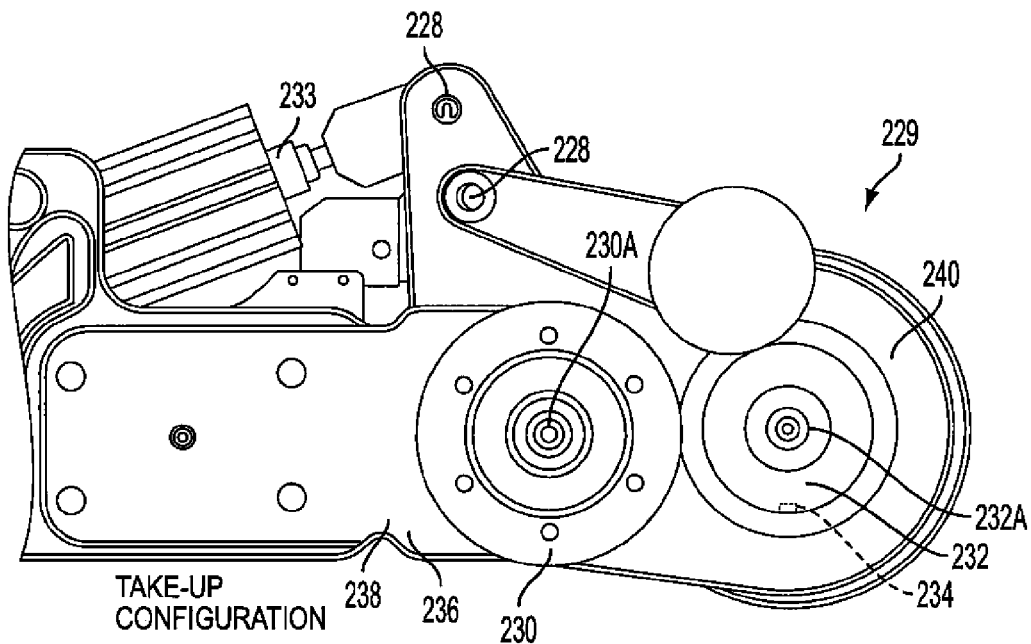
Figure 3F:
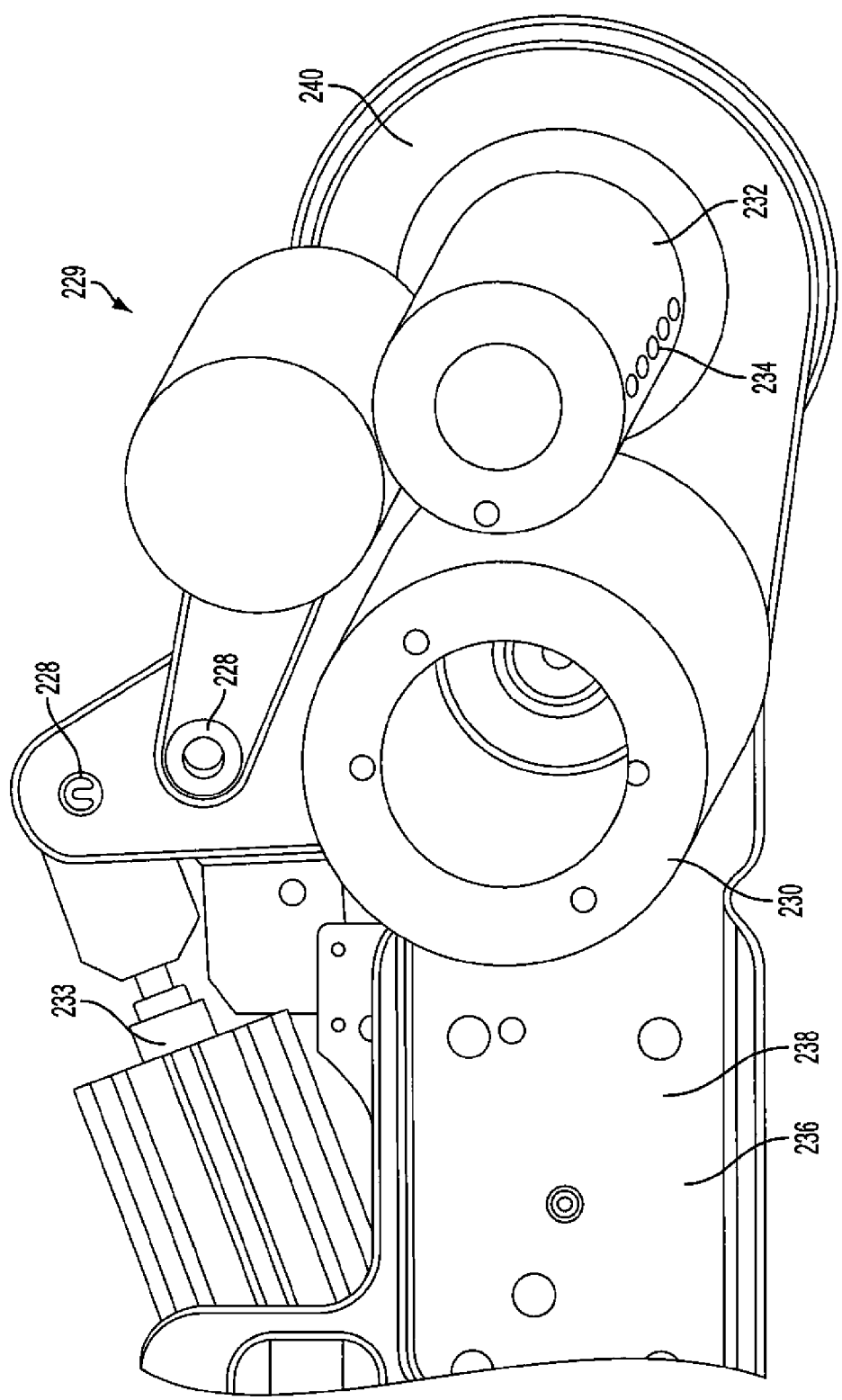

As shown in FIGS. 3D, 3E and 3F, take-up roller 232 also comprises one or more suction features 234. Suction features 234 may comprise orifices coupled in fluid communication to a source of suction (not shown in the illustrated views). The controller may control the suction source using suitable control signals (not shown). Suction features 234 may be ported to a bore (not shown) within take-up roller 232. The bore may be coupled to the suction source using rotary joint on one end of roller 232.

As with sheet removal apparatus 129, peel roller 230 of sheet removal apparatus 229 is a non-driven "idler" roller. In alternative embodiments, peel roller 230 may be rotationally driven.

As shown in FIG. 3B, sheet removal apparatus 229 also comprises one or more chassis-position actuators 231 which cause relative translational movement between chassis 236 and imaging table 204. Such translational movement may generally be over any path, such a linear path, a series of linear paths, a curved path, a series of curved paths, or a series of linear and curved paths, for example. For clarity, only a single chassis-position actuator 231A is shown in the illustrated view. Chassis-position actuator 231A moves chassis 236 in directions which have components that are either toward or away from imaging table 204. In the illustrated embodiment, chassis-position actuator 231A comprises a pneumatic actuator. Those skilled in the art will appreciate that other types of suitable coupled actuators, such as suitably coupled electric motors, could be used to implement chassis-position actuator 231A.

Sheet removal apparatus 229 also comprises one or more chassis-position actuators 231 (not specifically shown in the illustrated views), which cause relative translational movement between chassis 236 and imaging table 204 in directions which are generally aligned with imaging table 204. Relative translational movement between the imaging table and chassis 236 results in corresponding translational movement between imaging table 204 and rollers 230, 232 which are coupled to chassis 236. Again the relative movement created by chassis-position actuators 231 may generally involve translation over any path. The controller may control chassis-position actuators 231 and the corresponding movement of chassis 236 using suitable control signals (not shown).

Sheet removal apparatus 229 operates in a manner similar to that of sheet removal apparatus 129 described above. When it is desired to remove donor element 212 from substrate 210, the controller causes chassis-position actuators 231 to move chassis 236 (and the rest of sheet removal apparatus 229) into the vicinity of one edge 212A of donor element 212. In the illustrated embodiment, such a movement of chassis 236 comprises the extension of pneumatic chassis actuator 231A and sheet removal apparatus 229 approaches donor element 212 from a direction corresponding to the direction of extension of pneumatic chassis actuator 231A (see FIG. 3B). In other embodiments, chassis-position actuators 231 cause sheet removal apparatus 229 to approach donor element 212 from other directions. Sheet removal apparatus 229 moves toward donor element 212 until peel roller 230 makes contact with donor element 212. Preferably, peel roller 230 makes initial contact with donor element 212 in a non-imaged region of thereof, so as to minimize the impact on the imaged region of substrate 210.

In addition to moving chassis 236, the controller causes take-up roller axis-position actuator 233 to move take-up roller 232 into the vicinity of edge 212A of donor element 212. In the illustrated embodiment, movement of take-up roller 232 into the vicinity of edge 212A of donor element 212 involves extension of pneumatic actuator 233. This configuration of sheet removal apparatus 229 may be referred to as a "pick-up configuration" and is shown best in FIG. 3D. Preferably, the controller uses a combination of chassis-position actuators 231 and take-up roller translation actuator 233 to move take-up roller 232 into the vicinity of a non-imaged region of donor element 212. Preferably, the controller uses a combination of chassis-position actuators 231 and take-up roller translation actuator 233 to move take-up roller 232 into the vicinity of a region of donor element 212 that extends transversely beyond the edge of substrate 210. Prior to or during the movement of take-up roller 232 into the vicinity of donor element 212, the controller may also cause take-up router rotational actuator 239 to pivot take-up roller 232 about its axis 232A so as to position suction features 234 in a location proximate to donor element 212. To position suction features 234 in this manner, the controller may operate take-up roller rotational actuator 239 in a position mode.

The controller then causes the suction source to apply suction through suction features 234. The application of suction through suction features 234 causes a portion of donor element 212 (including its leading edge 212A) to adhere to take-up roller 232 (i.e. suction features 234 secure a portion of donor element 212 to take-up roller 232). Take-up roller 232 may be brought into the vicinity of, or contact, donor element 212 prior to application of suction through suction features 234, although this is not necessary. In general, take-up roller 232 need only be positioned sufficiently close to donor element 212 that donor element 212 is drawn toward, and is secured to, take-up roller 232 by the suction applied through suction features 234.

Once leading edge 212A of donor element 212 (or a portion of donor element including leading edge 212A) is secured to the cylindrical surface of take-up roller 232, the controller causes take-up roller axis-position actuator 233 to move take-up roller away from imaging table 204. In the illustrated embodiment, such a movement of take-up roller axis-position actuator 233 corresponds to a retraction of pneumatic actuator 233. When axis-position actuator 233 is retracted (i.e. take-up roller 232 is spaced-apart from the imaging table) and peel roller 230 is in contact with donor element 212, sheet removal apparatus 239 may be said to be in a "take-up configuration". The take-up configuration is shown best in FIG. 3E.

Peel roller 230 preferably remains in contact with, and may exert force against, donor element 212. Consequently, a portion of donor element 212 on one side of peel roller 230 (i.e. the side away from take-up roller 232) remains in contact with substrate 210 while a portion of donor element 212 on the opposite side of peel roller 230 (i.e. the same side as take-up roller 232) peels away from substrate 210 and bends around the circumferential surface of peel roller 230. Characteristics of peel roller 230 and/or characteristics of the manner in which peel roller 230 contacts donor element 212 can be used to control the effective area of contact between donor element 212 and substrate 210 immediately prior to peeling.

During the movement of take-up roller 232 away from substrate 210, the controller may also cause take-up roller rotational actuator 239 to pivot take-up roller 232 about its axis 232A. The controller may control take-up roller rotational actuator 239 in torque mode to track a desired tension on the portion of donor element 212 removed from substrate 210. The amount of movement of take-up roller 232 away from imaging table 204 (i.e. the amount of retraction of take-up roller axis-position actuator 233) may be varied to achieve a desired peel angle θ.

Next, the controller causes chassis-position actuators 231 to effect relative movement between chassis 236 and imaging table 204 in a direction generally aligned with imaging table 204 and, at the same time, causes take-up roller rotation actuator 239 to rotate take-up roller 232 so as to take-up donor element 212 on take-up roller 232. This simultaneous movement of chassis 236 (including rollers 230, 232) with respect to imaging table 204 and rotation of take-up roller 232 with respect to chassis 236 peels donor element 212 from substrate 210. The controller may operate take-up roller rotational actuator 239 in a torque mode to track a desired peeling tension on donor element 212. In other embodiments, the controller 108 operates take-up roller rotational actuator 239 in a position mode to track a position that is synchronized with the translational position of chassis 236.

As take-up roller 232 rotates, donor element 212 winds around the cylindrical surface of take-up roller 232. Peel roller 230 preferably remains in contact with the portion of donor element 212 which is still on substrate 210. Peel roller 230 prevents donor element 212 from separating prematurely from substrate 210 and ensures that donor element 212 is separated from substrate 210 at the desired peel angle θ.

The use of peel roller 230 and take-up roller 232 in combination also prevents the "print-through" effect. Since take-up roller 232 is spaced-apart from substrate 210 in the take-up configuration, the image imparted onto substrate 210 is unaffected when the portion of donor element 212 being wound onto take-up roller 232 overlaps the leading edge of donor element 212.

While a number of exemplary aspects and embodiments have been discussed above, those of skill in the art will recognize certain modifications, permutations, additions and sub-combinations thereof. For example:

The embodiments described above make use of controllers for controlling various components using various control signals and/or implementing various methods. Such controllers may be configured to execute suitable software and may comprise one or more data processors, together with suitable hardware, including, by way of non-limiting example: accessible memory, logic circuitry, drivers, amplifiers, A/D and D/A converters, input/output ports and like. Such controllers may comprise, without limitation, a microprocessor, a computer-on-a-chip, the CPU of a computer or any other suitable microcontroller. The controllers associated with the sheet removal apparatus described above may be, but need not necessarily be, the same controllers that control the operation of the corresponding imaging devices.

The controllers described above make use of control signals to control various components of their respective sheet removal apparatus. Those skilled in the art will appreciate that such control signals may each comprise pluralities of signals which may be transmitted from the controller to the component and/or from the component to the controller. In particular, the controlled components may comprise or otherwise work in conjunction with suitable sensors configured to sense the component characteristics and to feed this information back to the controller. The controllers may comprise or otherwise work in conjunction with suitable hardware or software to effect control of the various components. Such control signals may also comprise "open loop" control signals which rely on predetermined calibration and do not specifically incorporate feedback from sensors.

The sheet removal apparatus described above are used in conjunction with flatbed imaging apparatus. In other embodiments, sheet removal apparatus according to the invention may be used in conjunction with drum-based imaging apparatus wherein substrates and donor elements are wrapped around the cylindrical surface of the drum for imaging. To remove a donor element from the substrate in such embodiments, the peel roller is moved into contact with the surface of the donor element. The take-up roller is moved into a vicinity of the donor element (i.e. a pick-up configuration) to pick up the donor element and is then moved away from the imaging drum (i.e. to a take-up configuration) before being rotated to wind the donor element onto the take-up roller. In such embodiments, it is not necessary to translate the take-up roller with respect to the substrate when the donor sheet is winding on the surface of the take-up roller. Instead, the same effect may be achieved by rotating the imaging drum.

In the above described embodiments, the peel rollers are described as being idler rollers, but this is not necessary. In other embodiments, the peel rollers could be driven rollers. In such embodiments, the driven peel rollers may effect the translational motion of the carriage with respect to the imaging table (i.e. the driven peel rollers may function as carriage movement actuators).

In the above described embodiments, the peel rollers and take-up rollers are described as contacting the donor element in non-imaged areas. This is not necessary. In some embodiments, it may be desirable to image the entire area of a donor element 112.

In the above-described embodiments, the take-up rollers are described as having suction features for securing edge 112A of donor element 112 to the take-up roller. Those skilled in the art will appreciate that means could be used to secure the leading edge 112A of donor element 112 to the take-up roller. By way of non-limiting example, such other means include mechanical clamping means, magnetic holding means, male and female coupling means or the like.

In the embodiments described above, the peel rollers are described as contacting donor element 112 during removal thereof. For some embodiments, it is desirable that the peel roller be very close to, but just out of contact with donor element 112 (at least until donor element 112 is separated from substrate 110). With such a configuration, donor element 112 may contact the peel roller once it has separated from substrate 110, but the peel roller prevents donor element 112 from separating prematurely and thereby changing the peel angle θ.

In some embodiments, the cylindrical surfaces of the peel rollers are coated with an elastomeric material to minimize the impact of their contact with the imaged region of the donor material.

The suction features described above may be apertures in the cylindrical surfaces of their corresponding rollers or may comprise suction features that project from the cylindrical surface of their corresponding rollers, such as discrete suction cups or the like.

As will be apparent to those skilled in the art in light of the foregoing disclosure, many alterations and modifications are possible in the practice of this invention without departing from the spirit or scope thereof.

What is claimed is:

1. A method for removing a donor element from a substrate, the method comprising:
    effecting relative movement between a peel roller and the substrate so as to move the peel roller into a vicinity of a first portion of the donor element, the first portion spaced-apart from an edge of the donor element;
    effecting relative movement between a take-up roller and the substrate so as to move the take-up roller into a vicinity of the edge of the donor element and, when the take-up roller is in the vicinity of the edge, securing a second portion of the donor element including the edge to the take-up roller; and while maintaining the peel roller in the vicinity of the first portion:
    effecting relative movement between the take-up roller and the substrate so as to move the take-up roller and the second portion of the donor element secured thereto in a direction away from the substrate; and
    rotating the take-up roller about its axis while effecting relative movement between the substrate and the peel roller in a direction parallel to a surface of the substrate to peel at least a substantial portion of the donor element from the substrate.

2. A method according to claim 1 wherein the vicinity of the first portion of the donor element is sufficiently close to the donor element that, when located in the vicinity of the first portion, the peel roller maintains the first portion in contact with the substrate.

3. A method according to claim 1 wherein the vicinity of the first portion of the donor element comprises contact with the first portion of the donor element.

4. A method according to claim 1 wherein rotating the take-up roller about its axis while effecting relative movement between the substrate and the peel roller comprises simultaneously effecting relative movement between the substrate and both the peel roller and the take-up roller in the direction tangential to the substrate.

5. A method according to claim 1 comprising, imaging the substrate by image-wise transferring donor material from the donor element to the substrate in the same apparatus in which the donor element is removed from the substrate.

6. A method according to claim 5 wherein the substrate is located on a substantially planar imaging table and wherein the direction parallel to a surface of the substrate comprises a direction substantially parallel to a surface of the imaging table.

7. A method according to claim 5 wherein the substrate is located on a cylindrical surface on an imaging drum and the direction parallel to a surface of the substrate comprises a direction substantially tangential to the cylindrical surface of the imaging drum.

8. A method according to claim 4 comprising providing a chassis for supporting the take-up roller and the peel roller and wherein effecting relative movement between the take-up roller and the substrate so as to move the take-up roller and the second portion of the donor element secured thereto in the direction away from the substrate comprises moving the take-up roller with respect to the chassis.

9. A method according to claim 8 wherein moving the take-up roller with respect to the chassis comprises moving the take-up roller along a path having a radius of curvature centered at an axis of the peel roller.

10. A method according to claim 8 wherein simultaneously effecting relative movement between the substrate and both the peel roller and the take-up roller comprises effecting relative movement between the substrate and the chassis.

11. A method according to claim 8 wherein effecting relative movement between the take-up roller and the substrate so as to move the take-up roller into the vicinity of the edge of the donor element comprises moving the take-up roller with respect to the chassis.

12. A method according to claim 11 wherein moving the take-up roller with respect to the chassis comprises moving the take-up roller along a path having a radius of curvature centered at an axis of the peel roller.

13. A method according to claim 4 wherein the vicinity of the first portion of the donor element comprises contact with the first portion of the donor element.

14. A method according to claim 13 wherein rotating the take-up roller about its axis while simultaneously effecting relative movement between the substrate and both the peel roller and the take-up roller comprises rotating the peel roller about its axis.

15. A method according to claim 14 wherein the peel roller is an idler roller.

16. A method according to claim 14 wherein the peel roller is a driven roller.

17. A method according to claim 13 wherein securing the second portion of the donor element to the take-up roller comprises providing suction through one or more suction features on a cylindrical surface of the take-up roller.

18. A method according to claim 17 comprising providing a take-up roller rotational actuator coupled to rotate the take-up roller about its axis and wherein effecting relative movement between a take-up roller and the substrate so as to move the take-up roller into the vicinity of the edge of the donor element comprises controllably moving the take-up roller rotational actuator in a position mode such that at least one of the one or more suction features is located proximate the second portion of the donor element.

19. A method according to claim 1 wherein securing the second portion of the donor element to the take-up roller comprises at least one of: clamping the second portion of the donor element to the take-up roller; providing suction through one or more suction features on a cylindrical surface of the take-up roller; providing electrostatic attraction force between the second portion of the donor element and the take-up roller; providing magnetic attraction force between the second portion of the donor element and the take-up roller; and providing adhesive between the second portion of the donor element and the take-up roller.

20. A method according to claim 18 wherein rotating the take-up roller about its axis while simultaneously effecting relative movement between the substrate and both the peel roller and the take-up roller comprises controllably moving the take-up roller rotational actuator in a torque mode to track a desired tension on a third portion of the donor element located between the peel roller and the take-up roller.

21. A method according to claim 18 wherein rotating the take-up roller about its axis while simultaneously effecting relative movement between the substrate and both the peel roller and the take-up roller comprises controllably moving the take-up roller rotational actuator in a position mode, the position mode synchronized with the relative movement between the substrate and both the peel roller and the take-up roller.

22. A method according to claim 13 wherein effecting relative movement between the take-up roller and the substrate so as to move the take-up roller and the second portion of the donor element secured thereto in the direction away from the substrate establishes a peel angle at which the donor element is removed from the substrate, and the peel angle of less than 30°.

23. A method according to claim 5 wherein, during imagewise transferring of donor material from the donor element to the substrate, the donor element is secured to the substrate by a donor element securing means provided at a first location spaced apart from an edge of the substrate and wherein effecting relative movement between the take-up roller and the substrate so as to move the take-up roller into the vicinity of the edge of the donor element comprises moving the take-up roller into a second location, the second location spaced apart further from the edge of the substrate than the first location.

24. A method according to claim 4 wherein effecting relative movement between the peel roller and the substrate so as to move the peel roller into the vicinity of the first portion of the donor element comprises establishing contact between the peel roller and a non-imaged region of the donor element.

25. A method according to claim 24 wherein effecting relative movement between the take-up roller and the substrate so as to move the take-up roller into the vicinity of the edge of the donor element comprises establishing contact between the take-up roller and the non-imaged region of the donor element at a location spaced further from an imaged region of the donor element than a location at which the peel roller contacts the donor element.

26. A method according to claim 25 wherein the donor element is supported by one or more stands spaced apart from an edge of the substrate and wherein effecting relative movement between the take-up roller and the substrate so as to move the take-up roller into the vicinity of the edge of the donor element comprises establishing contact between the take-up roller and the non-imaged region of the donor element at a location of at least one of the one or more stands.

27. A method according to claim 26 wherein suction is provided between the edge of the substrate and the one or more stands and wherein the method comprises reducing the suction provided between the edge of the substrate and the one or more stands while effecting relative movement between the take-up roller and the substrate so as to move the take-up roller and the second portion of the donor element secured thereto in the direction away from the substrate.

28. An apparatus for removing a donor element from a substrate, the apparatus comprising:
a peel roller;
a take-up roller comprising a securing mechanism for securing a first portion of the donor element, which includes an edge of the donor element, to the take-up roller;
a chassis for supporting the peel roller and the take-up roller, such that the peel roller is rotatable relative to the chassis and the take-up roller is both moveable and rotatable relative to the chassis; and
a controller configured to:
effect relative movement between the chassis and the substrate so as to move the chassis to a position where the peel roller is in a vicinity of a second portion of the donor element, the second portion spaced-apart from the edge of the donor element;
effect relative movement between the take up roller and the substrate so as to move the take-up roller into a vicinity of the first portion of the donor element and, when the take-up roller is in the vicinity of the first portion, activate the securing mechanism to secure the first portion to the take-up roller; and
while maintaining the peel roller in the vicinity of the second portion of the donor element: effect relative movement between the take-up roller and the substrate so as to move the take-up roller and the first portion of the donor element secured thereto in a direction away from the substrate; and rotate the take-up roller about its axis while effecting relative movement between the substrate and the peel roller in a direction parallel to a surface of the substrate to peel at least a substantial portion of the donor element from the substrate.

29. An apparatus according to claim 28 wherein the vicinity of the second portion of the donor element is sufficiently close to the donor element that, when located in the vicinity of the second portion, the peel roller maintains the second portion in contact with the substrate.

30. An apparatus according to claim 28 wherein the vicinity of the second portion of the donor element comprises contact with the second portion of the donor element.

31. An apparatus according to claim 28 wherein the controller is configured to rotate the take-up roller about its axis while simultaneously effecting relative movement between the substrate and both the peel roller and the take-up roller in the direction tangential to the substrate to peel at least the substantial portion of the donor element from the substrate.

32. An apparatus according to claim 28 wherein the apparatus forms a part of an imaging device in which donor material is image-wise transferred from the donor element to the substrate.

33. An apparatus according to claim 32 wherein the substrate is located on a substantially planar imaging table and wherein the direction parallel to a surface of the substrate comprises a direction substantially parallel to a surface of the imaging table.

34. An apparatus according to claim 32 wherein the substrate is located on a cylindrical surface on an imaging drum and the direction parallel to a surface of the substrate comprises a direction substantially tangential to the cylindrical surface of the imaging drum.

35. An apparatus according to claim 31 wherein the vicinity of the second portion of the donor element comprises contact with the second portion of the donor element.

36. An apparatus according to claim 35 wherein the peel roller is an idler roller.

37. An apparatus according to claim 35 wherein the peel roller is a driven roller.

38. An apparatus according to claim 35 wherein the securing mechanism comprises one or more suction features on a cylindrical surface of the take-up roller the suction features connected to a source of suction.

39. An apparatus according to claim 35 comprising a take-up roller rotational actuator coupled to drivably rotate the take-up roller about its axis.

40. An apparatus according to claim 39 wherein, when the take-up roller moves into the vicinity of the first portion of the donor element, the controller is configured to controllably move the take-up roller rotational actuator in a position mode such that the securing mechanism is located proximate the second portion of the donor element.

41. An apparatus according to claim 39 wherein, when the take-up roller rotates about its axis while relative movement is effected between the substrate and both the peel roller and the take-up roller, the controller is configured to controllably move the take-up roller rotational actuator in a torque mode to track a desired tension on a third portion of the donor element located between the peel roller and the take-up roller.

42. An apparatus according to claim 39 wherein the take-up roller rotates about its axis while relative movement is effected between the substrate and both the peel roller and the take-up roller, the controller is configured to controllably move the take-up roller rotational actuator in a position mode, the position mode synchronized with the relative movement between the substrate and both the peel roller and the take-up roller.

43. An apparatus according to claim 35 comprising a take-up roller axis-position actuator coupled to move the take-up roller with respect to the chassis.

44. An apparatus according to claim 43 wherein the take-up roller axis position actuator is coupled to move the take-up roller along a path having a radius of curvature centered at an axis of the peel roller.

45. An apparatus according to claim 43 wherein, when the take-up roller and the first portion of the donor element secured thereto move in a direction away from the substrate, the controller is configured to controllably move the take-up roller axis-position actuator in a position mode to establish a peel angle at which the donor element is removed from the substrate.

46. An apparatus according to claim 45 wherein the peel angle is in a range of 5°-30°.

47. An apparatus according to claim 45 wherein the take-up roller axis position actuator is coupled to move the take-up roller along a path having a radius of curvature centered at an axis of the peel roller.

48. An apparatus according to claim 35 comprising one or more chassis-position actuators for effecting relative movement between the chassis and the substrate.

49. An apparatus according to claim 48 wherein, when the chassis moves to a position where the peel roller is in a vicinity of the second portion of the donor element, the controller is configured to controllably move at least one of the one or more chassis-position actuators in a position mode.

50. An apparatus according to claim 48 wherein, when relative movement is effected between the substrate and both the peel roller and the take-up roller in the direction tangential to the substrate, the controller moves at least one of the one or more chassis-position actuators in a position mode.

51. An apparatus according to claim 32 wherein, during image-wise transfer of donor material from the donor element to the substrate, the donor element is secured to the substrate by a donor element securing means provided at a first location spaced apart from an edge of the substrate and wherein when the take-up roller moves into the vicinity of the edge of the donor element, the take-up roller moves to a second location, the second location spaced apart further from the edge of the substrate than the first location.

52. An apparatus according to claim 31 wherein, when the controller effects relative movement between the chassis and the substrate so as to move the chassis to the position where the peel roller is in the vicinity of the second portion of the donor element, the controller is configured to establish contact between the peel roller and a non-imaged region of the donor element.

53. An apparatus according to claim 52 wherein, when the controller effects relative movement between the take up roller and the substrate so as to move the take-up roller into a vicinity of the first portion of the donor element, the controller is configured to establish contact between the take-up roller and the non-imaged region of the donor element at a location spaced further from an imaged region of the donor element than a location at which the peel roller contacts the donor element.

54. An apparatus according to claim 53 wherein the donor element is supported by one or more stands spaced apart from an edge of the substrate and wherein, when the controller effects relative movement between the take up roller and the substrate so as to move the take-up roller into a vicinity of the first portion of the donor element, the controller is configured to establish contact between the take-up roller and the non-imaged region of the donor element at a location of at least one of the one or more stands.

55. An apparatus according to claim 54 wherein suction is provided between the edge of the substrate and the one or more stands and the controller is configured to reduce the suction provided between the edge of the substrate and the one or more stands while effecting relative movement between the take-up roller and the substrate so as to move the take-up roller and the first portion of the donor element secured thereto in a direction away from the substrate.

* * * * *